(12) United States Patent
Dalvi et al.

(10) Patent No.: US 9,246,877 B2
(45) Date of Patent: Jan. 26, 2016

(54) PLACING A VIRTUAL EDGE GATEWAY APPLIANCE ON A HOST COMPUTING SYSTEM

(71) Applicant: VMware, Inc., Palo Alto, CA (US)

(72) Inventors: Tanmay Dalvi, Pune (IN); Amita Savagaonkar, Pune (IN)

(73) Assignee: VMware, Inc., Palo Alto, CA (US)

(*) Notice: Subject to any disclaimer, the term of this patent is extended or adjusted under 35 U.S.C. 154(b) by 48 days.

(21) Appl. No.: 14/019,545

(22) Filed: Sep. 6, 2013

(65) Prior Publication Data

US 2015/0074793 A1 Mar. 12, 2015

(51) Int. Cl.
*G06F 17/00* (2006.01)
*H04L 29/06* (2006.01)
*G06F 15/173* (2006.01)
*H04J 1/16* (2006.01)
*H04L 12/801* (2013.01)
*H04L 12/46* (2006.01)
*H04L 12/701* (2013.01)

(52) U.S. Cl.
CPC ......... *H04L 63/0272* (2013.01); *H04L 12/4641* (2013.01); *H04L 29/06* (2013.01); *H04L 45/00* (2013.01); *H04L 47/10* (2013.01); *H04L 63/08* (2013.01); *H04L 63/20* (2013.01)

(58) Field of Classification Search
CPC ..... H04L 63/20; H04L 63/08; H04L 63/0272; H04L 12/4641; H04L 29/06; H04L 45/00; H04L 47/10
USPC ................... 726/15, 1, 14; 713/153; 709/238; 370/230
See application file for complete search history.

(56) References Cited

U.S. PATENT DOCUMENTS

2013/0268799 A1* 10/2013 Mestery et al. ................. 714/4.2
2014/0165128 A1*  6/2014 Auvenshine ............ H04L 63/20
                                                            726/1

* cited by examiner

*Primary Examiner* — Aravind Moorthy

(57) ABSTRACT

Techniques for placing a virtual edge gateway appliance on at least one host computing system are described. In one embodiment, a virtual switch assigned to a tenant for creating virtual networks is identified. Further, at least one host computing system having access to the virtual switch is identified. Furthermore, placing a virtual edge gateway appliance on the at least one identified host computing system is recommended to allow connectivity to networks created using the virtual switch assigned to the tenant.

23 Claims, 3 Drawing Sheets

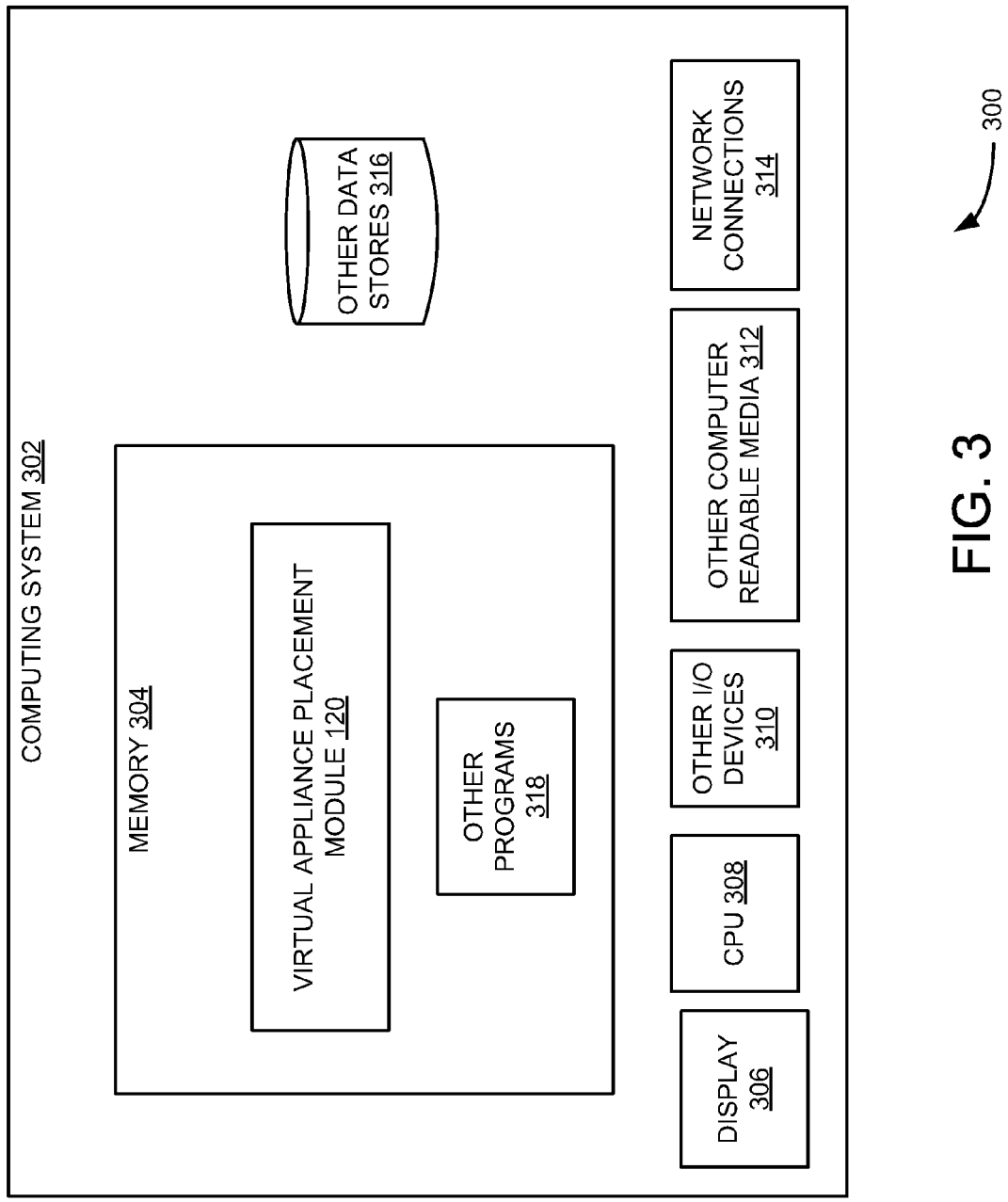

PLACING A VIRTUAL EDGE GATEWAY APPLIANCE ON A HOST COMPUTING SYSTEM

TECHNICAL FIELD

The present disclosure relates to methods, techniques, and systems for network resource management and, more particularly, to methods, techniques, and systems for placing a virtual edge gateway appliance on a host computing system by anticipating future network connectivity requirements.

BACKGROUND

Cloud management systems provide the ability to build secure, multi-tenant clouds by pooling virtual infrastructure resources into virtual datacenters and exposing them to tenants through Web-based portals and programmatic interfaces as a fully-automated, catalog-based service. Further, the cloud management systems may use a virtual edge gateway appliance for providing network address translation (NAT), firewall, dynamic host configuration protocol (DHCP), virtual private network (VPN), load balancer, and other gateway services or network functions to the virtual datacenters assigned to the tenants. The virtual edge gateway appliance is typically created for a virtual datacenter with one or more external networks. Existing method may try to place the virtual edge gateway appliance on one or more host computing systems in the cloud management systems as per its compute, storage and network requirements. While the external network requirements are known, there can be one or more internal networks which may not exist today but can connect to the virtual edge gateway appliance in future.

The internal network, for example, an organization virtual datacenter network allows virtual machines within an organization to communicate with each other and also can be connected to the external network to provide external connectivity such as interne connectivity or connectivity to the tenant's organization through other means. When such a new network is connected to the virtual edge gateway appliance, the virtual edge gateway appliance may need to be migrated to an appropriate one or more host computing systems to provision the new network. This migration may not be feasible at run time as it would disrupt the network traffic passing through the virtual edge gateway appliance.

BRIEF DESCRIPTION OF THE DRAWINGS

FIG. 3 is an example block diagram of a cloud management server for implementing a virtual appliance placement module, such as the one shown in FIG. 1.

DETAILED DESCRIPTION

Figure 1:
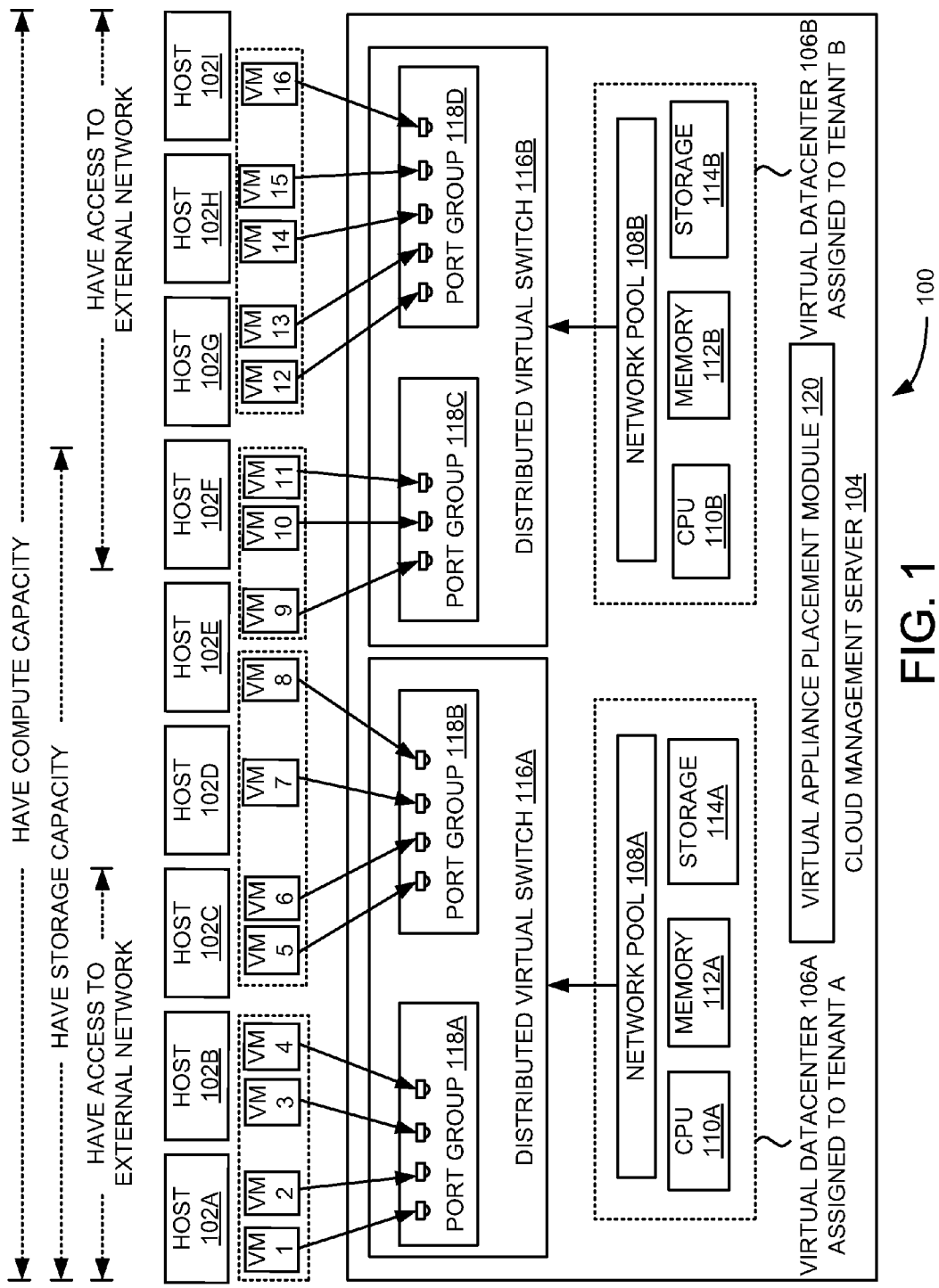
FIG. 1 is an example system view of a cloud management system illustrating determining host computing systems for placing a virtual edge gateway appliance.

Embodiments described herein provide enhanced computer-based and network-based methods, techniques, and systems for placing a virtual edge gateway appliance on a host computing system in a cloud management system. The term "cloud management system" refers to a system that provides cloud computing for virtual datacenters by pooling virtual infrastructure resources (e.g., central processing unit (CPU), memory, storage, and network connectivity) and delivering them to users (e.g., organizations, tenants, and so on) as catalog-based services.

Further, the cloud management system, such as VMware vCloud Director™, may use the virtual edge gateway appliance, such as the vShield Edge Gateway virtual appliance, for providing gateway services or network functions to a virtual datacenter assigned to a tenant. The gateway services or network functions may include, but not limited to, network address translation (NAT), firewall, dynamic host configuration protocol (DHCP), virtual private network (VPN), load balancer, and static routing.

The present technique provides a virtual appliance placement module that places the virtual edge gateway appliance on one of the host computing systems by anticipating future network connectivity requirements. The future network connectivity requirements refer to networks that will be created within the virtual datacenter in future and need connectivity to the virtual edge gateway appliance. This can be achieved by considering configuration of network resources (e.g., virtual switches) assigned to the virtual datacenter for dynamically creating virtual networks, anticipates one or more host computing systems that will have connectivity to networks that will be created in future and may need connectivity to the virtual edge gateway appliance, and recommends placing of the virtual edge gateway appliance on one of the host computing systems. For example, virtual networks are used for the network traffic originating from or terminating into virtual machines (VMs) and/or virtual networking appliances. This network traffic is segregated, forwarded and routed according to the programmatic configuration of the virtual switches and appliances and, in certain cases, physical switches and appliances through the configuration and logic inside controller software as opposed to the individual and manual configuration of physical routers, switches and appliances.

In one example embodiment, the virtual edge gateway appliance is placed on the one or more host computing systems as follows. First, a resource scheduling framework provides a set of host computing systems as candidates for placing the virtual edge gateway appliance. These candidate host computing systems will have the required storage and compute capacity for accommodating the virtual edge gateway appliance. Further, the set of candidate host computing systems are filtered based on their external network connectivity.

Furthermore, a network pool of resources configured for the tenant is considered. The network pool refers to a group of resources to create undifferentiated networks that are available for use within the tenant's virtual datacenter as virtual application networks and virtual datacenter networks. The virtual switch (e.g., a standard virtual switch, a distributed virtual switch, an open virtual switch and any other switch used for network virtualization) used to configure this network pool exists on one or more host computing systems. For example, the virtual switch can be configured to provide access to local or external network resources for one or more VMs in the virtual datacenter assigned to the tenant. This virtual switch connectivity is also considered for placing the virtual edge gateway appliance since the virtual switch will be used in future to dynamically create new networks within the virtual datacenter allocated to the tenant. Finally, the list of candidate host computing systems is filtered using their connectivity to the virtual switch. The virtual edge gateway appliance can now be placed on one of the final filtered list of candidate host computing systems. The present technique in this way considered future network connectivity requirements for the virtual edge gateway appliance. Although the following description use the virtual switch assigned to tenant's virtual datacenter, the same concept can be extended to use any other information associated with resources used to provision new networks.

In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

FIG. 1 is an example system view of cloud management system 100 illustrating determining host computing systems for placing a virtual edge gateway appliance. Particularly, cloud management system 100 illustrates cloud management server 104 communicative with host computing systems 102A-I. Each host computing system 102A-I has one or more VMs running therein. In the example shown in FIG. 1, cloud management server 104 includes virtual datacenters 106A and 106B assigned to tenants A and B, respectively. Each of virtual datacenters 106A and 106B is allocated with its respective compute resources (e.g., central processing unit (CPU) 110A and 110B and memory 112A and 112B), storage resources 114A and 114B, and network pools 108A and 108B (i.e., network resources) that are carved out to each tenant from a common pool of physical infrastructure. For example, a network pool may refer to a group of resources to create undifferentiated networks that can be used as virtual application networks and tenant's virtual datacenter networks. In the example shown in FIG. 1, cloud management server 104 is described using two virtual datacenters 106A and 106B, however, any number of virtual datacenters can be configured in cloud management server 104.

Further, cloud management server 104 includes distributed virtual switches 116A and 116B that are configured for virtual datacenters 106A and 106B, respectively, to provide the compute, storage, and network resources to the VMs. In the example shown in FIG. 1, the VMs running on host computing systems 102A-I are connected to distributed virtual switches 116A and 116B via port groups 118A-D. The example shown in FIG. 1 is explained with respect to distributed virtual switch, however, the present invention can also be applicable to any other type of virtual switch such as a standard virtual switch, an open virtual switch and any other switch used for network virtualization.

Furthermore, cloud management server 104 includes virtual appliance placement module 120. One skilled in the art can appreciate that virtual appliance placement module 120 can also be provided in a VM or virtual application that can run on any host computing system and can be provided to a user through a graphical user interface as a part of management software.

To allow connectivity to new networks that will created in virtual datacenter 106A assigned to tenant A, virtual appliance placement module 120 recommends placing the virtual edge gateway appliance on one of host computing systems 102A-I as follows. First, virtual appliance placement module 120 identifies host computing systems 102A-C and 102F that are having required compute capacity, required storage capacity, and external network connectivity from host computing systems 102A-I. For example, the required compute capacity refers to capacity of CPU and memory to accommodate the virtual edge gateway appliance. The required storage capacity refers to capacity of data store to accommodate the virtual edge gateway appliance. The external network is the network created to allow VMs in organizations in cloud management system 100 to access Internet.

In the example shown in FIG. 1, host computing systems 102A-I are having the required compute capacity, host computing systems 102A-F are having the required storage capacity, and host computing systems 102A-C and 102F-I are having access to the external network. In this case, host computing systems 102A-C and 102F are having required compute capacity, required storage capacity, and external network connectivity, and hence virtual appliance placement module 120 considers host computing systems 102A-C and 102F for placing the virtual edge gateway appliance.

Further, virtual appliance placement module 120 identifies distributed virtual switch 116A that is assigned to tenant A for creating virtual networks on virtual datacenter 106A. Furthermore, virtual appliance placement module 120 filters host computing systems 102A-C and 102F based on their connection to distributed virtual switch 116A. In the example shown in FIG. 1, host computing systems 102A-C are having access to distributed virtual switch 116A and host computing system 102F is not having access to distributed virtual switch 116A. Therefore, virtual appliance placement module 120 identifies host computing systems 102A-C as candidates for placing the virtual edge gateway appliance and recommends placing the virtual edge gateway appliance on one of host computing systems 102A-C to allow connectivity to networks that will be created in future using distributed virtual switch 106A assigned to tenant A.

Figure 2:
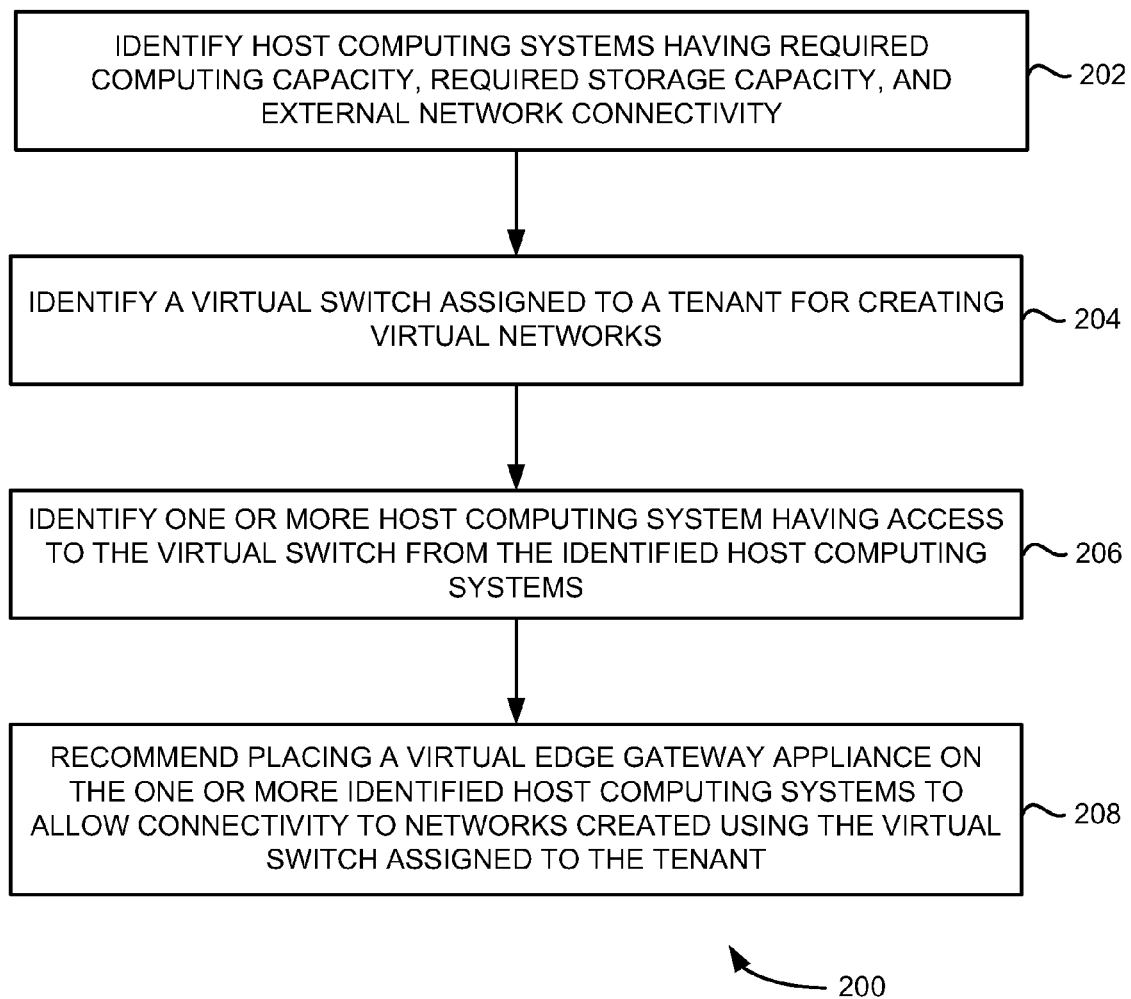
FIG. 2 is a flow chart of an example method for recommending placing a virtual edge gateway appliance on a host computing system.

FIG. 2 is flow chart 200 of an example method for recommending placing a virtual edge gateway appliance on one or more host computing systems. The virtual edge gateway appliance provides services or network functions selected from the group consisting of firewall, DHCP, load balancer, NAT, VPN and static routing.

At step 202, host computing systems in the cloud management system having required compute capacity, required storage capacity, and external network connectivity are identified. The compute capacity includes a central processing unit (CPU) capacity and/or memory capacity and the storage capacity includes capacity associated with a data store. At step 204, a virtual switch assigned to a tenant for creating virtual networks is identified. The virtual switch includes a standard virtual switch, a distributed virtual switch, an open virtual switch and/or any other switch used for network virtualization. The virtual switch is configured for a virtual datacenter assigned to the tenant. At step 206, one or more host computing systems having access to the virtual switch are identified from the identified host computing systems. In this case, the one or more host computing systems having required compute capacity, required storage capacity, external network connectivity, and access to the virtual switch are identified from the host computing systems. At step 208, placing a virtual edge gateway appliance on the one or more identified host computing systems is recommended to allow connectivity to new networks created using the virtual switch assigned to the tenant. The new network refers to a network that will be created within a virtual datacenter in future and need connectivity to the virtual edge gateway appliance.

FIG. 3 is block diagram 300 of an example physical computing system 302 (e.g., cloud management server 104 shown in FIG. 1) including virtual appliance placement module 120 according to an example embodiment. In particular, FIG. 3 shows computing system 302 that may be utilized to implement virtual appliance placement module 120. Note that one or more general purpose virtual or physical computer systems suitably instructed may be used to implement virtual appliance placement module 120. In addition, computing system 302 may comprise one or more distinct computing systems/devices and may span distributed locations.

In the embodiment shown, computing system 302 may comprise computer memory ("memory") 304, display 306, one or more Central Processing Units ("CPU") 308, input/output devices 310 (e.g., keyboard, mouse, etc.), other computer-readable media 312, and network connections 314. Virtual appliance placement module 120 is shown residing in memory 304. The components of virtual appliance placement module 120 may execute on one or more CPUs 308 and implement techniques described herein. Other code or programs 318 (e.g., an administrative interface, a Web server, and the like) may also reside in memory 304, and execute on one or more CPUs 308. Further, other data repositories, such as data store 316, may also reside in computing system 302. One or more of the components in FIG. 3 may not be present in any specific implementation. For example, some embodiments may not provide other computer readable media 312 or display 306.

Virtual appliance placement module 120 interacts via network with host computing systems in the cluster. The network may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication to and from remotely situated humans and/or devices.

In addition, programming interfaces to the data stored as part of virtual appliance placement module 120, such as in data store 316, can be available by standard mechanisms such as through C, C++, C#, and Java APIs; libraries for accessing files, databases, or other data repositories; through scripting languages such as XML; or through Web servers, FTP servers, or other types of servers providing access to stored data. Furthermore, in some embodiments, some or all of the components of virtual appliance placement module 120 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like.

Some or all of the system components and/or data structures may also be stored as contents (e.g., as executable or other machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

The invention claimed is:

1. An automated method for recommending placing a virtual edge gateway appliance on at least one host computing system comprising:
   identifying a virtual switch assigned to a tenant for creating virtual networks based on future network connectivity requirements of the tenant;
   identifying at least one host computing system having access to the virtual switch; and
   recommending placing a virtual edge gateway appliance on the at least one identified host computing system that is having access to the virtual switch to allow connectivity to networks created using the virtual switch assigned to the tenant.

2. The method of claim 1, wherein identifying the at least one host computing system having access to the virtual switch, comprises:
   identifying a plurality of host computing systems having required compute capacity, required storage capacity, and external network connectivity; and
   identifying the at least one host computing system that is having access to the virtual switch from the plurality of host computing systems.

3. The method of claim 2, wherein the compute capacity comprises at least one of a central processing unit (CPU) capacity and memory capacity.

4. The method of claim 2, wherein the storage capacity is associated with a data store.

5. The method of claim 1, wherein the virtual switch comprises at least one of a standard virtual switch, a distributed virtual switch, an open virtual switch and any other switch used for network virtualization.

6. The method of claim 1, wherein the virtual switch is configured for a virtual datacenter assigned to the tenant.

7. The method of claim 1, wherein the virtual edge gateway appliance provides services or network functions selected from the group consisting of firewall, dynamic host configuration protocol (DHCP), load balancer, network address translation (NAT), virtual private network (VPN) and static routing.

8. A system comprising:
   a plurality of host computing systems; and
   a management server comprising a virtual appliance placement module to:
      identify a virtual switch assigned to a tenant for creating virtual networks based on future network connectivity requirements of the tenant;
      identify at least one host computing system having access to the virtual switch; and
      recommend placing a virtual edge gateway appliance on the at least one identified host computing system that is having access to the virtual switch to allow connectivity to networks created using the virtual switch assigned to the tenant.

9. The system of claim 8, wherein the virtual appliance placement module is further configured to:
   identify host computing systems having required compute capacity, required storage capacity, and external network connectivity from the plurality of host computing systems.

10. The system of claim 9, wherein the virtual appliance placement module identifies the at least one host computing system that is having access to the virtual switch from the identified host computing systems.

11. The system of claim 10, wherein the virtual appliance placement module recommends placing the virtual edge gateway appliance on the at least one host computing system having the required compute capacity, required storage capacity, external network connectivity and access to the virtual switch.

12. The system of claim 9, wherein the compute capacity comprises at least one of a central processing unit (CPU) capacity and memory capacity.

13. The system of claim 9, wherein the storage capacity is associated with a data store.

14. The system of claim 8, wherein the virtual switch comprises at least one of a standard virtual switch, a distributed virtual switch, an open virtual switch and any other switch used for network virtualization.

15. The system of claim 8, wherein the virtual switch is configured for resources in a virtual datacenter assigned to the tenant.

16. The system of claim 8, wherein the virtual edge gateway appliance provides services or network functions selected from the group consisting of firewall, dynamic host configuration protocol (DHCP), load balancer, network address translation (NAT), virtual private network (VPN) and static routing.

17. A non-transitory computer-readable storage medium including instructions that are configured, when executed by a computing system, to perform a method for recommending placing a virtual edge gateway appliance on at least one host computing system, the method comprising:
identifying a virtual switch assigned to a tenant for creating virtual networks based on future network connectivity requirements of the tenant;
identifying at least one host computing system having access to the virtual switch; and
recommending placing a virtual edge gateway appliance on the at least one identified host computing system that is having access to the virtual switch to allow connectivity to networks created using the virtual switch assigned to the tenant.

18. The non-transitory computer-readable storage medium of claim 17, wherein identifying the at least one host computing system having, access to the virtual switch, comprises:
identifying a plurality of host computing systems having required compute capacity, required storage capacity, and external network connectivity; and
identifying the at least one host computing system that is having access to the virtual switch from the plurality of host computing systems.

19. The non-transitory computer-readable storage medium of claim 18, wherein the compute capacity comprises at least one of a central processing unit (CPU) capacity and memory capacity.

20. The non-transitory computer-readable storage medium of claim 18, wherein the storage capacity is associated with a data store.

21. The non-transitory computer-readable storage medium claim 17, wherein the virtual switch comprises at least one of a standard virtual switch, a distributed virtual switch, an open virtual switch and any other switch used for network virtualization.

22. The non-transitory computer-readable storage medium of claim 17, wherein the virtual switch is configured for resources in a virtual datacenter assigned to the tenant.

23. The non-transitory computer-readable storage medium of claim 17, wherein the virtual edge gateway appliance provides services or network functions selected from the group consisting of firewall, dynamic host configuration protocol (DHCP), load balancer, network address translation (NAT), virtual private network (VPN) and static routing.

* * * * *